Jan. 30, 1951

A. LIECHTI 2,539,516

LAMINATED ELECTRIC CONDENSER

Filed March 24, 1948

INVENTOR
ALBERT LIECHTI.
BY K. A. Mayr
ATTORNEY

UNITED STATES PATENT OFFICE 2,539,516

LAMINATED ELECTRIC CONDENSER

Albert Liechti, Zurich, Switzerland, assignor to Micafil A. G., Zurich-Altstetten, Switzerland, a corporation of Switzerland Application March 24, 1948, Serial No. 16,821
In Switzerland February 19, 1947

3 Claims. (Cl. 175—41)

The present invention relates to electric roll condensers, particularly for low electric tension, say up to 100 volts, having a dielectric composed of a plurality of layers of laminated material which is impregnated by an insulating medium, the thickness of said dielectric being greater at its marginal portions than at its central portion.

The present application is a continuation in part of my copending application Serial No. 7,608, filed February 11, 1948.

The increased thickness of the border portions of the dielectric is obtained by inserting thin intermediary layers of insulating material between the main layers. It is an object of the invention to provide a construction which obviates undesirable effects occurring in the condenser at its regions of transition from the central portion without intermediary layers to the portion thickened by the provision of intermediary layers. At these regions the layers are subjected more or less to bending stresses and the metallic layers which are between the insulating layers may be thereby so deformed as to crack or to have curvatures of such small radii as to cause increased field concentration which counteracts the reduction of glow effects obtained by the increased thickness of the dielectric.

Thickening of the border regions of a condenser by the use of loose and rough surfaced insulating layers adjacent both sides of the metallic layers at the border regions of the condenser increases its capacity. Such layers, however, cannot be made so thin as to avoid an increase of field concentration which neutralizes the beneficial effect of this type of intermediary layers.

Low tension condensers, say up to 100 volts, having no more than 2 to 6 main insulating layers of conventional thickness are effectively improved according to the invention by the provision of 1 to 3 intermediary strips of layers adjacent to both sides of the metallic layers at least at those marginal portions of the condenser where the metallic layers do not project from the insulating layers. To avoid undesirable abrupt changes of direction of the main layers at the transition to the thickened border regions the thickness of the intermediary layers must not exceed a critical value and the widths of the adjacent intermediary strips are preferably different.

According to the invention insulating intermediary layers are provided adjacent to both sides of a metallic layer at least at those border portions of the condenser where the metallic layers do not project and the thickness of said intermediary layers does not exceed $12 \times 10^{-4}$ cm.

With this limited thickness curvatures of the metallic layers at the transition from the interior of the condenser to its border portions which cause undesired field concentration are eliminated as well as any unpermissible deforming effect on the electrodes. In spite of the small thickness of the intermediary layers a considerable increase of capacity is obtained with insulating materials conventionally used in low tension condensers.

Further and other objects of the present invention will be hereinafter set forth in the accompanying specification and claims and shown in the drawings which, by way of illustration, show what I now consider to be preferred embodiments of my invention.

In the drawings.

Like parts are designated by like numerals in all figures of the drawings.

Figure 1:
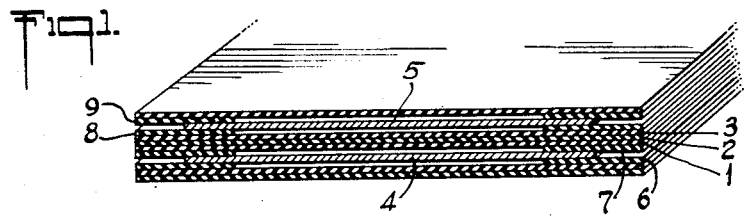
Fig. 1 is a cross sectional, perspective view of a condenser strip according to the invention suitable to be wound to form a coil and be compressed thereafter.

Fig. 1 illustrates diagrammatically an example of arrangement of unpressed layers according to the invention as used for winding a condenser. Three main or full width insulating layers 1, 2, 3 are disposed between the metallic layers 4 and 5. Directly adjacent to both sides of the border regions of the metallic layers 4 and 5 are strips of intermediary insulating layers 6, 7 and 8, 9, respectively, of no more than $12 \times 10^{-4}$ cm. thickness. To produce the same layer arrangement between all metallic layers after winding, two additional main layers are provided below metallic layer 4 and one above layer 5. The coil produced by winding is preferably pressed to form a flat pad whereby all layers as well at the center portion as at the marginal portions are in full and close contact.

Figure 2:
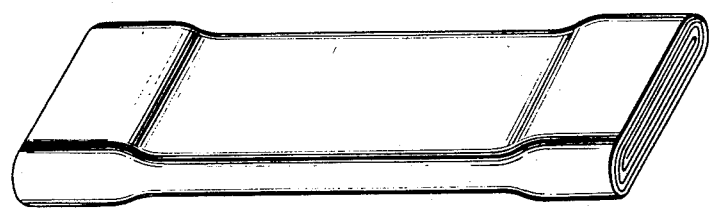
Fig. 2 is a perspective view of a coil wound from the strip shown in Fig. 1 and flattened.

The resulting flattened roll is illustrated in Fig. 2.

If each of the full width layers 1 to 3 is $8 \times 10^{-4}$ cm. thick and each intermediary layer 6 to 9 is $12 \times 10^{-4}$ cm. thick the increase of the thickness of the dielectric at its border regions amounts to about 100%. If a condenser of same dimensions but without thickening of the dielectric at the border regions can be operated at a voltage $U_1$ without glow effects, the condenser with thickened border regions according to the invention can be operated at a voltage of $U_2 = \sqrt{2} \times U_1$ as it has been found that this voltage is proportional to the square root of the thickness of the dielectric. The power that the condenser can accumulate is proportional to the square of the ionization tension and is increased, in this case, by the factor 2.

If intermediary strips of dielectric laminae of $8 \times 10^{-4}$ cm. thickness are placed as per Fig. 1 and the condenser has five full width layers of $15 \times 10^{-4}$ cm. thickness each, the thickness of the border regions is increased by about 20% which permits an increase of tension by the factor $\sqrt{1.2}$ and consequently an increase of the power that the condenser can accumulate by the factor 1.2.

It is, of course, assumed that the dielectric at the unreenforced regions permits such an increase of electric tension altogether.

Figure 3:
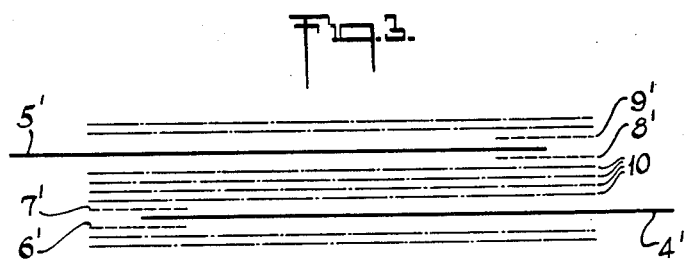
Fig. 3 is a diagrammatic sectional view of a modified layer arrangement according to the invention.

Fig. 3 illustrates diagrammatically a modified arrangement of the layers in unpressed condition. The full width insulating layers are shown in dash-dot lines and the intermediary narrow insulating laminae are shown by dotted lines. The full lines indicate metallic laminae. The metallic layers 4' and 5' project on opposite sides from the dielectric for better cooling. Four full width dielectric layers 10 are interposed between the metallic laminae and small width intermediary insulating layers 6', 7' and 8', 9' according to the invention are inserted only at those lateral border portions of the metallic layers which do not project.

Assuming that the full width dielectric laminae are $10 \times 10^{-4}$ cm. thick each and the narrow intermediary laminae are $12 \times 10^{-4}$ cm. thick each, the increase of thickness of the border regions amounts to about 30% which corresponds to an increase of permissible electric tension by the factor $\sqrt{1.3}$ and an increase of the power that the condenser can accumulate by 30%.

Figure 4:
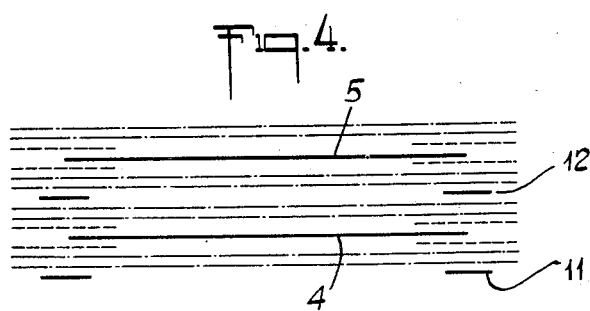
Fig. 4 is a diagrammatic sectional view of another modification of a layer arrangement according to the invention.

The power can be increased by a further factor 2 in all modifications by subdividing the lateral border portions of the dielectric between the metallic laminae 4 and 5 by narrow metallic laminae 11 and 12, as shown diagrammatically in Fig. 4. Care must be taken that the transition from the relatively thin interior region to the thickened border regions is as smooth as possible and the additional small width metallic layers are preferably produced by spraying, steaming or printing same to the adjacent dielectric layers.

Figure 5:
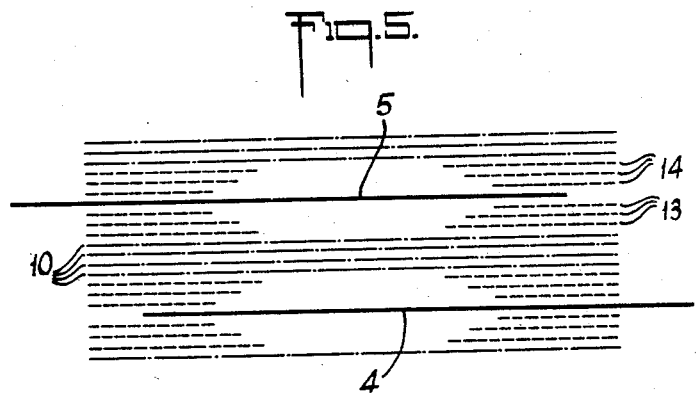
Fig. 5 is a diagrammatic sectional view of yet another modification of a layer arrangement according to the invention.
Figure 6:
Fig. 6 is an enlarged sectional view of a portion of the arrangement shown in Fig. 5.
Figure 7:
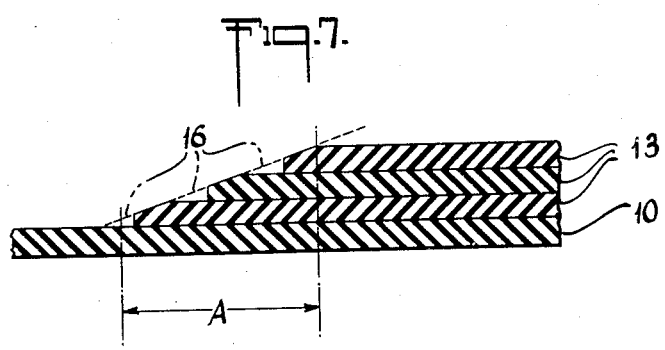
Fig. 7 is an enlarged sectional view of a modified portion of the arrangement shown in Fig. 5.

A further modification with a plurality of inserted intermediary, narrow laminae is illustrated in Fig. 5. Three narrow layers forming packages 13 and 14 are placed adjacent the border portions of the metallic laminae at both sides thereof and the thickness of the individual narrow layers is not more than $12 \times 10^{-4}$ cm. The individual narrow layers are of different width and so arranged that the packages which they form have a step-like configuration at their borders extending toward the center of the condenser. The height of the individual steps is not more than $12 \times 10^{-4}$ cm. and deformation of the metallic layers is reduced to a minimum.

While I believe the above described embodiments of my invention to be preferred embodiments, I wish it to be understood that I do not desire to be limited to the exact details of design and construction shown and described, for obvious modifications will occur to a person skilled in the art.

I claim:

1. A low tension electric roll condenser having, in combination, metallic laminae, a dielectric composed of a plurality of insulating laminae impregnated with an insulating medium interspersed between said metallic laminae and having an inner region and border regions, and at least one small width insulating layer disposed adjacent to each side of said metallic laminae at a border region thereof, the thickness of said small width layer being smaller than $12 \times 10^{-4}$ cm.

2. A low tension electric roll condenser comprising, in combination, metallic laminae, a dielectric composed of a plurality of insulating laminae impregnated with an insulating medium interspersed between said metallic laminae, the latter having a border region disposed within the insulating laminae, and at least one small width insulating layer disposed adjacent to each side of said metallic laminae at said border region, the thickness of said small width layer being smaller than $12 \times 10^{-4}$ cm.

3. A low tension electric roll condenser having, in combination, metallic laminae, a dielectric composed of a plurality of insulating laminae impregnated with an insulating medium interspersed between said metallic laminae and having an inner region and border regions, and at least one small width insulating layer disposed adjacent to each side of said metallic laminae at a border region thereof.

ALBERT LIECHTI.

REFERENCES CITED

The following references are of record in the file of this patent:

UNITED STATES PATENTS

| Number | Name | Date |
|---|---|---|
| 774,115 | Splitdorf | Nov. 1, 1904 |
| 923,889 | Pruessman | June 8, 1909 |
| 2,456,381 | Clark | Dec. 14, 1948 |

FOREIGN PATENTS

| Number | Country | Date |
|---|---|---|
| 670,494 | Germany | Jan. 19, 1939 |
| 351,366 | Great Britain | June 25, 1931 |

OTHER REFERENCES

"A New Kraft Capacitor Paper," General Electric Review, Dec. 1947, pp. 20 to 24. (Copy in 175–41M Lit.)